United States Patent
Suzuki et al.

(10) Patent No.: US 12,199,972 B2
(45) Date of Patent: Jan. 14, 2025

(54) INFORMATION PROCESSING SYSTEM, INFORMATION PROCESSING METHOD AND PROGRAM

(71) Applicant: NIPPON TELEGRAPH AND TELEPHONE CORPORATION, Tokyo (JP)

(72) Inventors: Ryohei Suzuki, Tokyo (JP); Tetsuya Okuda, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 255 days.

(21) Appl. No.: 17/926,077

(22) PCT Filed: May 25, 2020

(86) PCT No.: PCT/JP2020/020599
§ 371 (c)(1),
(2) Date: Nov. 17, 2022

(87) PCT Pub. No.: WO2021/240613
PCT Pub. Date: Dec. 2, 2021

(65) Prior Publication Data
US 2023/0188514 A1  Jun. 15, 2023

(51) Int. Cl.
*H04L 9/40* (2022.01)
(52) U.S. Cl.
CPC .............. *H04L 63/0823* (2013.01)
(58) Field of Classification Search
CPC ................................................. H04L 63/0823

USPC .......................................................... 713/156
See application file for complete search history.

(56) References Cited

U.S. PATENT DOCUMENTS 6,629,092 B1 *  9/2003  Berke ................... G06F 16/951
                                                          707/706
2019/0057212 A1 *  2/2019  Zhao ..................... G06Q 20/382

OTHER PUBLICATIONS

Santesson et al. (2004) "RFC 3709: Internet X.509 Public Key Infrastructure: Logotypes in X.509 Certificates," The Internet Society [online] Accessed on Sep. 22, 2022, Internet URL: https://www.rfc-editor.org/rfc/rfc3709.html.

* cited by examiner

*Primary Examiner* — Benjamin A Kaplan

(57) ABSTRACT

An information processing system includes a certification authority server, a web server, and a terminal. The certification authority server includes a processor, and a memory storing program instructions that cause the processor to receive an issuance request for a certificate transmitted from the web server, verify whether an operator of the web server has a right to use a trademark identified on the basis of information included in the issuance request, and transmit a certificate including the trademark to the web server when the operator has the right. The web server includes a processor, and a memory storing program instructions that cause the processor to transmit the certificate to the terminal in response to access from the terminal. The terminal includes a processor, and a memory storing program instructions that cause the processor to display the trademark included in the certificate. This improves reliability of the certificate including the trademark.

6 Claims, 6 Drawing Sheets

INFORMATION PROCESSING SYSTEM, INFORMATION PROCESSING METHOD AND PROGRAM

CROSS-REFERENCE TO RELATED APPLICATIONS

This application is a U.S. National Stage Application filed under 35 U.S.C. § 371 claiming priority to International Patent Application No. PCT/JP2020/020599, filed on 25 May 2020, the disclosure of which is hereby incorporated herein by reference in its entirety.

TECHNICAL FIELD

The present invention relates to an information processing system, an information processing method, and a program.

BACKGROUND ART

As a system indicating the identity of a website, there is an Extended Validation (EV) certificate. Identity display of the website using the EV certificate indicates that the website has acquired the EV certificate, by changing the display color of the management company or organization name of the site or displaying a key mark on the web browser. Thus, by using the EV certificate, the website can indicate information regarding its own identity to the user.

Moreover, NPL 1 provides a technical specification considering a system that is more easily understood by humans. In this specification, logo information can be included in the certificate.

CITATION LIST

Non Patent Literature

NPL 1: Logotypes (RFC 3709), [online], Internet URL: https://www.rfc-editor.org/rfc/rfc3709.html

SUMMARY OF THE INVENTION

Technical Problem

However, in NPL 1, confirmation of legitimacy of the logo is not specifically mentioned, and thus, unfortunately, the user can be deceived if a certain organization can embed a trademark similar to a logo or the like of another organization in a certificate.

The present invention has been made in view of the above points, and an object thereof is to improve reliability of a certificate including a trademark.

Means for Solving the Problem

In order to solve the above-described problems, an information processing system includes a certification authority server, a web server, and a terminal. The certification authority server includes a processor, and a memory storing program instructions that cause the processor to receive an issuance request for a certificate transmitted from the web server, verify whether an operator of the web server has a right to use a trademark identified on the basis of information included in the issuance request, and transmit a certificate including the trademark to the web server when the operator has the right. The web server includes a processor, and a memory storing program instructions that cause the processor to transmit the certificate to the terminal in response to access from the terminal. The terminal includes a processor, and a memory storing program instructions that cause the processor to display the trademark included in the certificate.

Effects of the Invention

The reliability of a certificate including a trademark can be improved.

DESCRIPTION OF EMBODIMENTS

Figure 1:
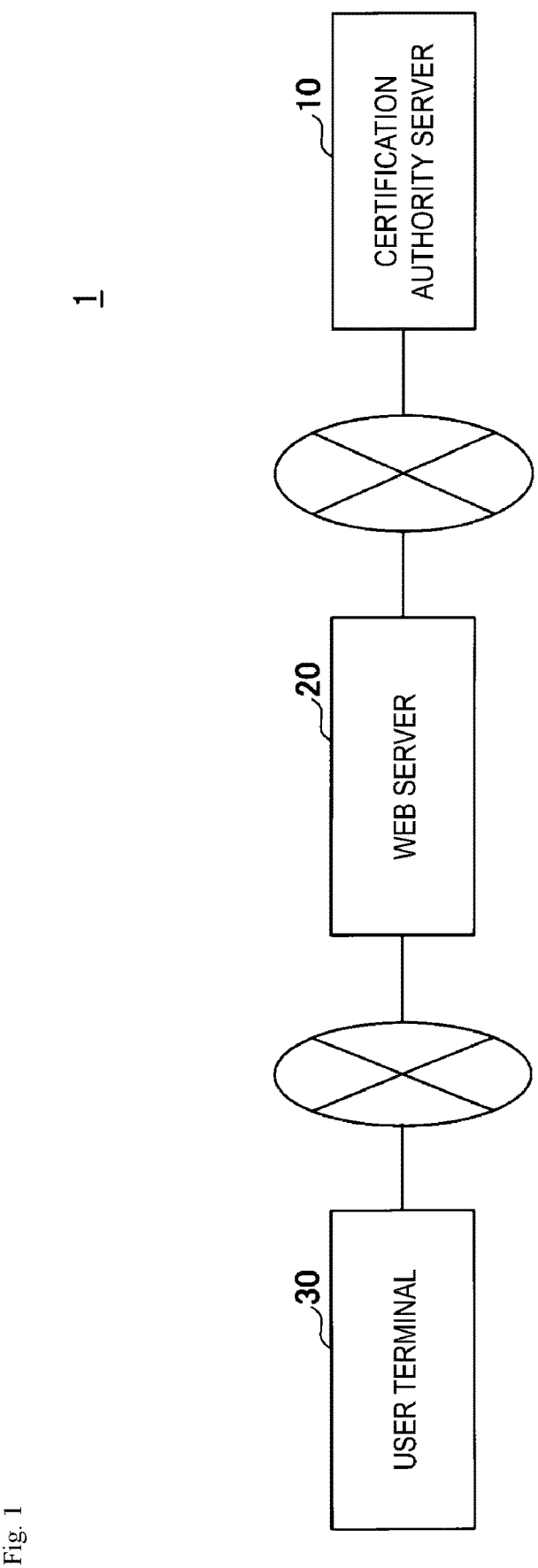
FIG. 1 is a diagram illustrating a configuration example of an information processing system 1 according to an embodiment of the present invention.

Hereinafter, an embodiment of the present invention will be described with reference to the drawings. FIG. 1 is a diagram illustrating a configuration example of an information processing system 1 according to an embodiment of the present invention. The information processing system 1 illustrated in FIG. 1 includes a user terminal 30, a web server 20, a certification authority server 10, and the like. The user terminal 30 and the web server 20 can communicate with each other via a network such as the Internet. The web server 20 and the certification authority server 10 can communicate with each other via a network such as the Internet.

The user terminal 30 is a terminal that includes a web browser and is used for a purpose such as browsing a web page of a certain website. For example, a personal computer (PC), a smartphone, a tablet terminal, or the like may be used as the user terminal 30.

The web server 20 is one or more computers on which the certain website is constructed. The operator of the web server 20 (website) is an individual, an organization, a group, or the like.

The certification authority server 10 is one or more computers included in a certification authority that issues an electronic certificate to the web server 20 (website) or the like. In the present embodiment, the certification authority server 10 issues a certificate (hereinafter, referred to as a "BV (Brand Validation) certificate") in which a trademark and a name of the trademark are embedded in the EV certificate. Hereinafter, for convenience, a trademark will be referred to as "logo", and a name of the trademark will be referred to as "service name".

In issuance of an EV certificate in the related art, the existence of an organization that has made an application is confirmed using a register, or an application manager is confirmed. Thus, by including the related-art EV certificate issuance process in the BV certificate issuance process, it is possible to confirm whether someone pretends to be another person to make an application for a BV certificate, so that certainty of the applicant (application organization) is guaranteed. In the present embodiment, when the BV certificate is issued, it is further confirmed whether the applicant has a right (trademark right or the like) to legitimately use the logo and the service name embedded in the BV certificate. In this manner, the BV certificate in which the service name and the logo are embedded can be issued only to a legitimate applicant (a person who has a legitimate right to use the logo). By displaying the service name and the logo included in the BV certificate on the web browser, the user can easily confirm the identity of the website.

Note that the information processing system 1 may include a plurality of user terminals 30, a plurality of web servers 20, and a plurality of certification authority servers 10.

Figure 2:
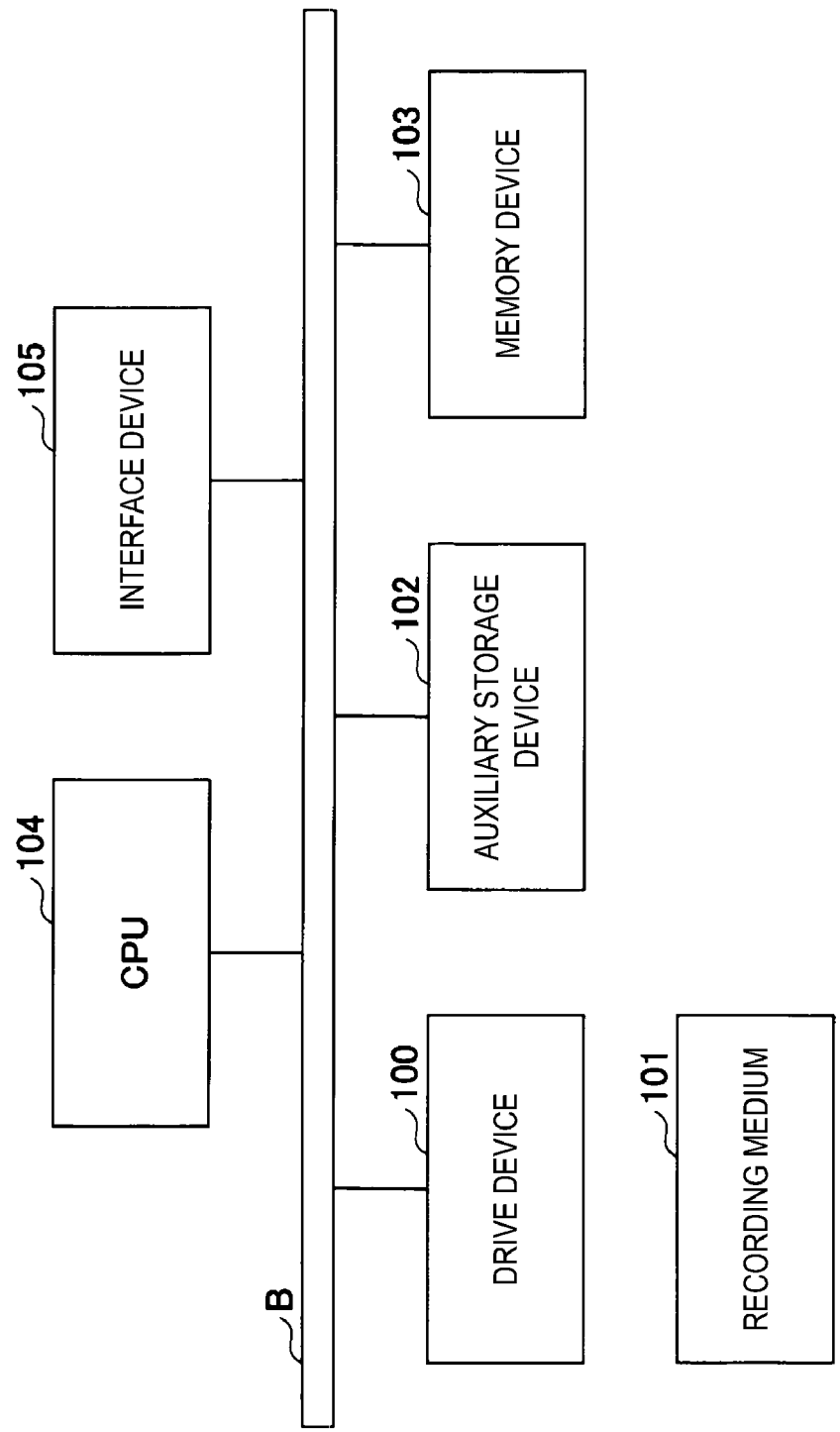
FIG. 2 is a diagram illustrating a hardware configuration example of a certification authority server 10 according to the embodiment of the present invention.

FIG. 2 is a diagram illustrating a hardware configuration example of the certification authority server 10 according to the embodiment of the present invention. The certification authority server 10 of FIG. 2 has a drive device 100, an auxiliary storage device 102, a memory device 103, a CPU 104, an interface device 105, and the like which are mutually connected by a bus B.

A program for implementing processing in the certification authority server 10 is provided by a recording medium 101 such as a CD-ROM. When the recording medium 101 storing the program is set in the drive device 100, the program is installed on the auxiliary storage device 102 from the recording medium 101 via the drive device 100. However, the program does not necessarily have to be installed from the recording medium 101 and may be downloaded from another computer via a network. The auxiliary storage device 102 stores the installed program and also stores necessary files, data, and the like.

The memory device 103 reads and stores the program from the auxiliary storage device 102 when the program is instructed to start. The CPU 104 executes a function related to the certification authority server 10 according to a program stored in the memory device 103. The interface device 105 is used as an interface for connection to a network.

Note that the web server 20 and the user terminal 30 may also have a hardware configuration as illustrated in FIG. 2.

Figure 3:
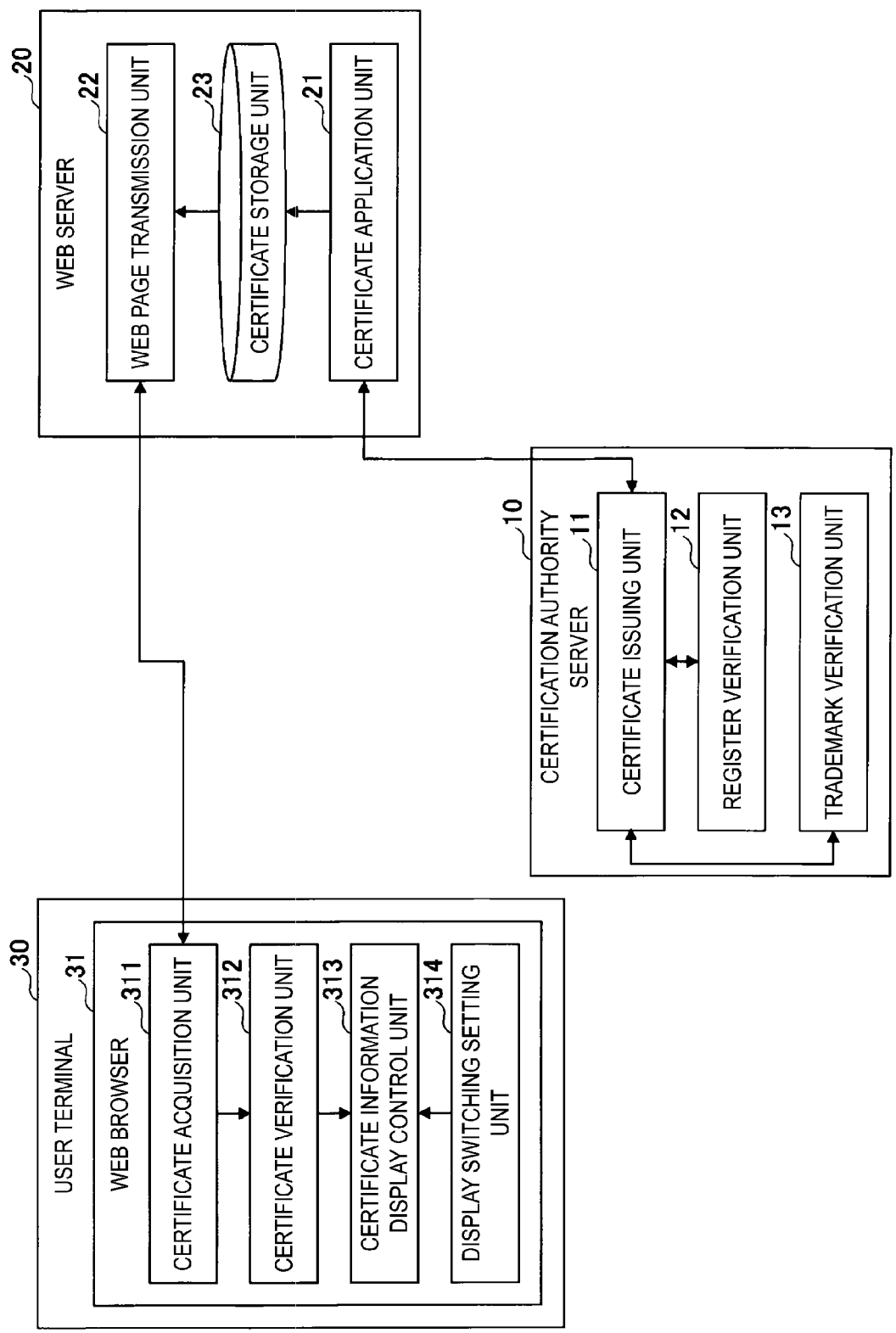
FIG. 3 is a diagram illustrating a functional configuration example of the information processing system 1 according to the embodiment of the present invention.

FIG. 3 is a diagram illustrating a functional configuration example of the information processing system 1 according to the embodiment of the present invention. In FIG. 3, the web server 20 includes a certificate application unit 21 and a web page transmission unit 22, and the like. Each of the units is implemented through a process that the CPU of the web server 20 is caused to execute by one or more programs installed in the web server 20. The web server 20 also uses a certificate storage unit 23. The certificate storage unit 23 can be implemented by using, for example, an auxiliary storage device included in the web server 20, a storage device connectable to the web server 20 via a network, or the like.

The certification authority server 10 includes a certificate issuing unit 11, a register verification unit 12, a trademark verification unit 13, and the like. Each of the units is implemented through a process that the CPU 104 is caused to execute by one or more programs installed in the certification authority server 10.

A program of the web browser 31 is installed in the user terminal 30. The program causes the user terminal 30 to function as a certificate acquisition unit 311, a certificate verification unit 312, a certificate information display control unit 313, a display switching setting unit 314, and the like.

Figure 4:
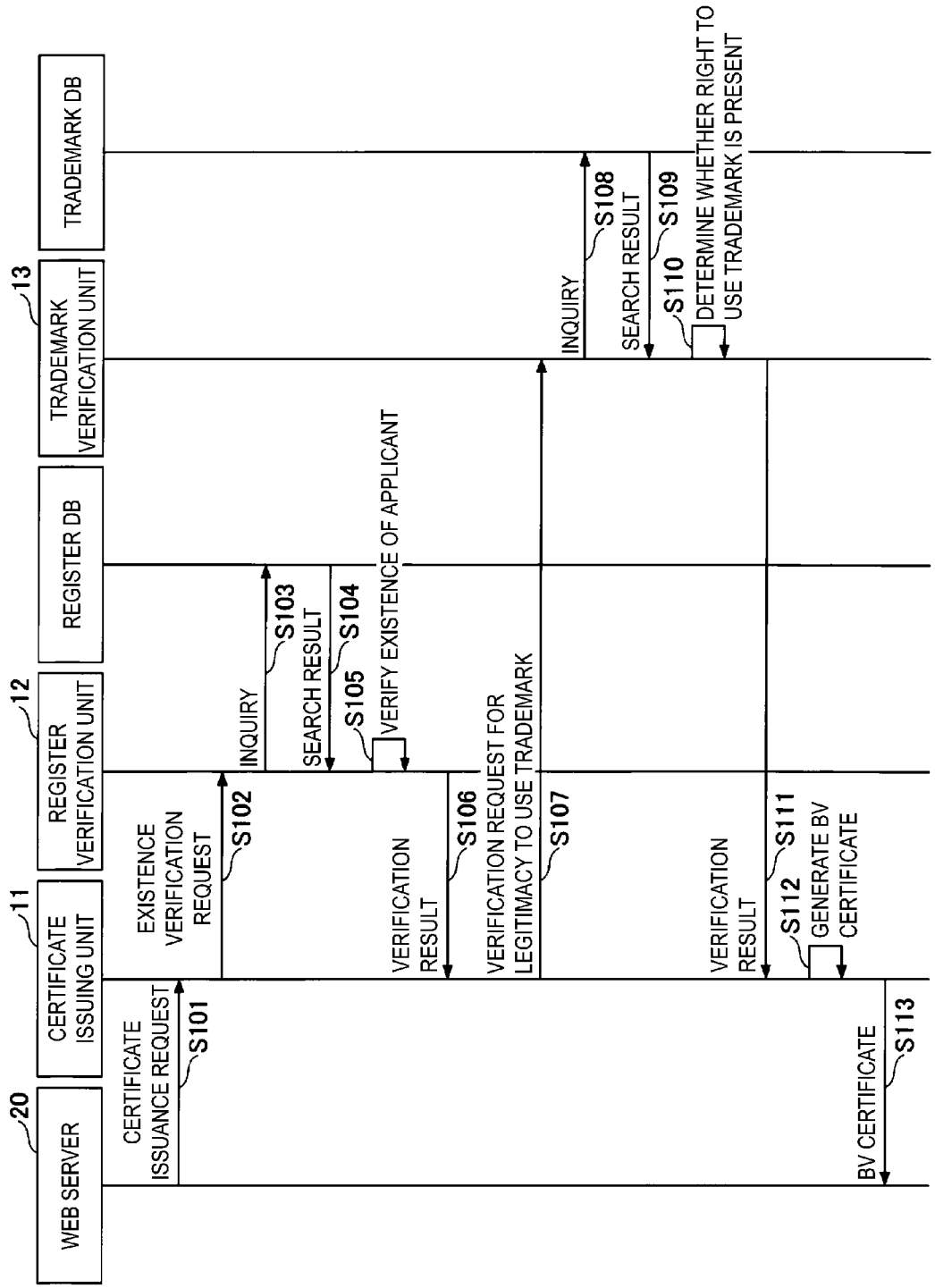
FIG. 4 is a sequence diagram for describing an example of a processing procedure of a BV certificate issuance process.

Hereinafter, a processing procedure that is executed in the information processing system 1 will be described. FIG. 4 is a sequence diagram for describing an example of a processing procedure of a BV certificate issuance process.

In step S101, the certificate application unit 21 of the web server 20 transmits a certificate issuance request including electronic data of the register (hereinafter, simply referred to as a "register"), the service name, and the logo to the certification authority server 10. Here, the service name is a string. The logo is, for example, image data.

Upon receiving the certificate issuance request, the certificate issuing unit 11 of the certification authority server 10 transmits, to the register verification unit 12, a request for existence verification of the applicant (the operator of the web server 20 that is the transmission source of the certificate issuance request) based on the register included in the certificate issuance request (S102). The request includes the register.

In response to the request, the register verification unit 12 verifies the existence of the applicant (whether the applicant has not been impersonated or falsified, and the like) by inquiring, for example, the register DB or the like for information of the register included in the request (S103 to S105). The register verification unit 12 transmits a response including the verification result to the certificate issuing unit 11. Note that the verification by the register verification unit 12 is only required to be executed using a known technique that is executed when the EV certificate is issued. Further, the register DB may be a database created in the certification authority, or may be a database that is open to the public.

If the verification result included in the response from the register verification unit 12 is negative for the existence of the applicant, the certificate issuing unit 11 does not execute step S106 and thereafter. On the other hand, if the verification result is affirmative with respect to the existence of the applicant (when the existence of the applicant is confirmed), the certificate issuing unit 11 executes step S106 and thereafter.

In step S106, the certificate issuing unit 11 transmits the verification request for legitimacy to use the logo and the service name (that is, the trademark) according to the certificate issuance request to the trademark verification unit 13. The verification request includes a service name, a logo, a register, and the like included in the certificate issuance request. Alternatively, the verification request may include the name of the applicant instead of the register.

In response to the verification request, the trademark verification unit 13 refers to, for example, the trademark DB to determine whether the applicant of the name included in the verification request has the right (for example, trademark right, or the like) to legitimately use the service name and the logo (that is, the trademark) included in the verification request (S108 to S110). For example, the trademark verification unit 13 may search the trademark DB for a trademark on the basis of the service name, and determine whether the applicant has the right on the basis of the search result. Specifically, in a case where the name of the trademark owner included in the search result matches the name of the applicant, and the image of the trademark included in the search result matches the logo included in the verification request, the trademark verification unit 13 may determine that the applicant has the right, and may determine that the applicant does not have the right in other cases. Note that the trademark DB may be, for example, a database commonly published by the Patent Office or the like. Alternatively, the certification authority may create the trademark DB in advance.

Alternatively, the verification request may include a name of the applicant and a search condition for the service name and the logo (that is, the trademark) of the verification target. In other words, the verification request does not necessarily have to include the service name and the logo themselves, and is only required to include information capable of identifying the service name and the logo (that is, the trademark). In this case, the search condition only needs to be included in the certificate issuance request in step S101, and when a trademark matching the search condition is found and a name of a trademark owner of the trademark matches the name of the applicant, it may be determined that the applicant has the right to legitimately use the service name and the logo related to the verification request.

The above determination result is a verification result for the verification request.

Subsequently, the trademark verification unit 13 transmits a response including the verification result to the certificate issuing unit 11 (S111). Note that, when the verification request does not include the service name and the logo and the verification result is affirmative, the trademark verification unit 13 causes the verification result to include the service name and the logo included in the search result from the trademark DB.

The certificate issuing unit 11 does not execute step S112 and thereafter if the verification result included in the response from the trademark verification unit 13 is negative (the applicant does not have the right to legitimately use the service name and the logo). On the other hand, if the verification result is affirmative (the applicant has the right to legitimately use the service name and the logo), the certificate issuing unit 11 executes step S112 and thereafter.

In step S112, the certificate issuing unit 11 generates a BV certificate. The BV certificate includes, for example, the service name and the logo included in the certificate issuance request or the service name and the logo corresponding to search conditions included in the certificate issuance request in addition to information recorded in the EV certificate.

Subsequently, the certificate issuing unit 11 transmits the generated BV certificate to the web server 20 (S113). The certificate application unit 21 of the web server 20 records the BV certificate in the certificate storage unit 23.

Next, processing executed by the user terminal 30 when a display instruction for the web page (website) of the web server 20 is input by the user will be described.

Figure 5:
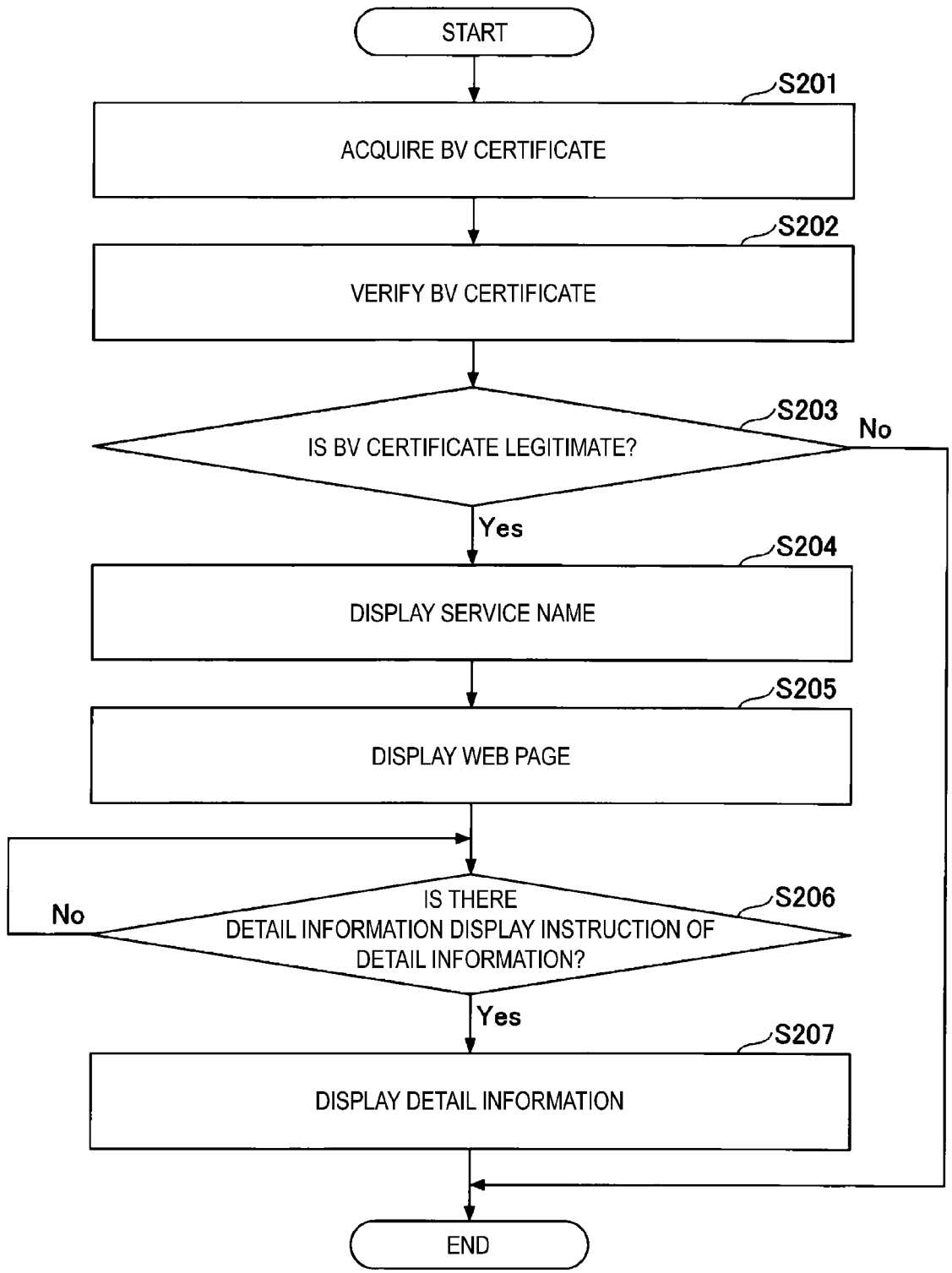
FIG. 5 is a flowchart for describing an example of a processing procedure executed by a user terminal 30 when a web page is displayed.

FIG. 5 is a flowchart for describing an example of a processing procedure executed by the user terminal 30 when a web page is displayed.

When the display instruction on the web page (for example, input of the URL to the address bar of the web browser 31, selection of a bookmark or selection of a link in another website, or the like) is input to the web browser 31 by the user, the certificate acquisition unit 311 acquires the BV certificate from the web server 20 corresponding to the web page (S201). More specifically, when the certificate acquisition unit 311 accesses (transmits a request to) the web server 20, the web page transmission unit 22 transmits the BV certificate stored in the certificate storage unit 23 to the certificate acquisition unit 311.

Subsequently, the certificate verification unit 312 verifies legitimacy of the BV certificate (S202). For example, verification is performed about whether the BV certificate is issued from the certification authority (certification authority server 10). Such verification is only required to be performed using known methods.

When a verification result by the certificate verification unit 312 is affirmative (when the BV certificate is confirmed to be legitimate) (Yes in S203), the certificate information display control unit 313 displays the service name included in the BV certificate on a side of the address bar of the web browser 31. With reference to this display, the user can confirm the identity of the website that the user has visited.

Figure 6:
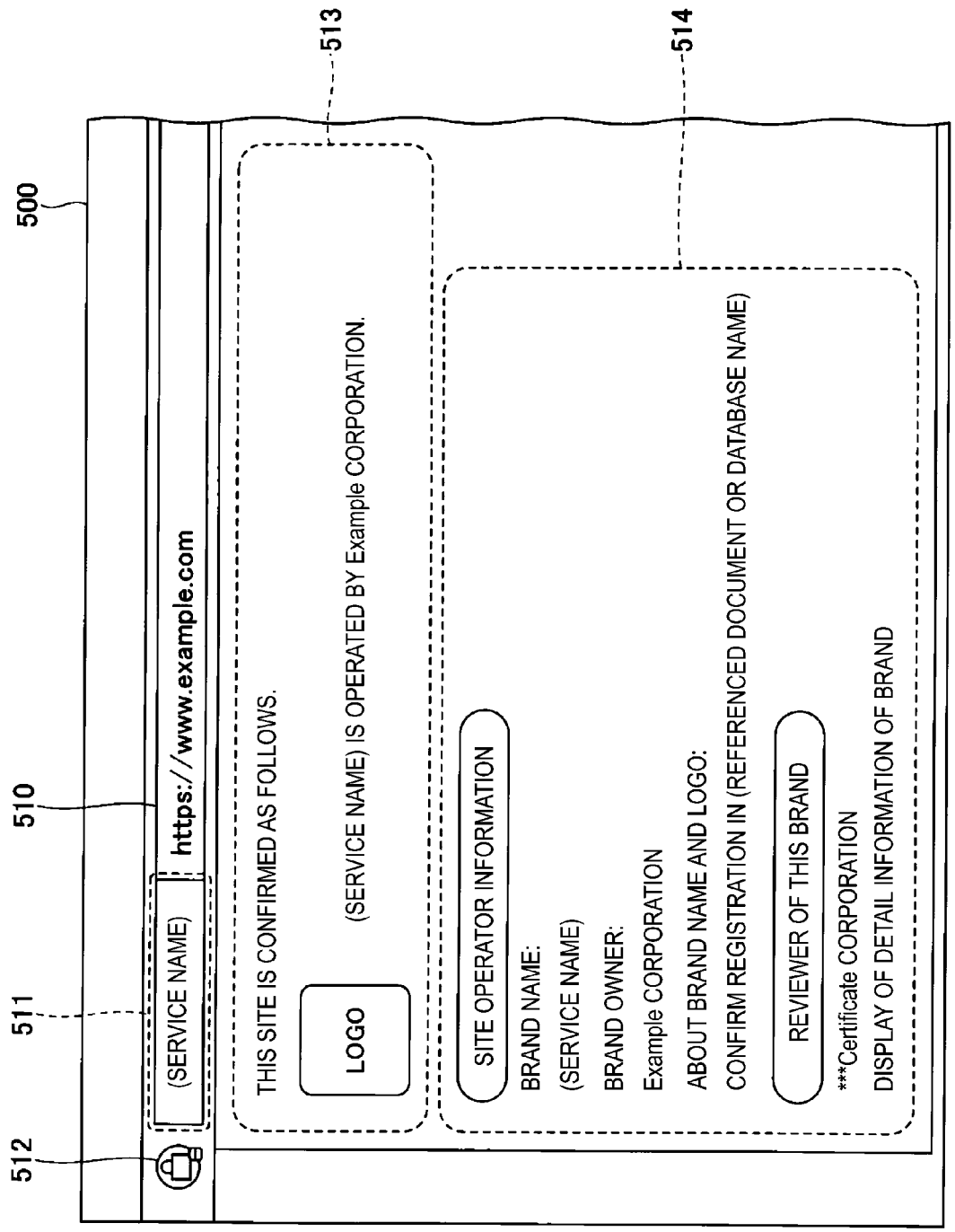
FIG. 6 is a diagram illustrating an example of displaying information of the BV certificate in a web browser 31.

FIG. 6 is a diagram illustrating an example of displaying information of the BV certificate in the web browser 31. FIG. 6 illustrates an example in which the service name included in the BV certificate is displayed on the region 511 on the left side of the address bar 510 of the window 500 of the web browser 31.

Subsequently, the web page is displayed on the web browser 31 in a known procedure (S205).

Thereafter, when the display instruction of detail information of the BV certificate is input from the user (Yes in S206), for example, by a predetermined operation such as a click of the key mark 512, the display switching setting unit 314 requests display of detail information to the certificate information display control unit 313. In response to the request from the display switching setting unit 314, the certificate information display control unit 313 displays each piece of information (detail information) recorded in the BV certificate whose legitimacy has been verified in step S202 in a region 513 and a region 514, and the like. The logo (image) and the service name and the like included in the BV certificate are displayed in the region 513. The region 514 displays other information included in the BV certificate.

As described above, by displaying the service name and the logo confirmed by the legitimate usage, the user can easily confirm whether the user is accessing the website (website that is not falsified) intended by himself or herself.

As described above, the BV certificate according to the present embodiment is issued after it is confirmed (verified) that the applicant (website) has a legitimate right for the trademark included in the BV certificate. In other words, a BV certificate including a trademark for which the applicant does not have a legitimate right will not be issued. Therefore, reliability of the certificate including the trademark can be improved.

Consequently, the user visiting the website can determine legitimacy of the website on the basis of the trademark (the logo and the service name, or the like) that is easy to understand by humans, which is displayed on the basis of the BV certificate of the website. Therefore, for example, it is possible to contribute to reduction of damage of phishing that occurs when the identity of the website cannot be identified.

Note that, in the present embodiment, the certificate issuing unit 11 is an example of a reception unit and a first transmission unit. The trademark verification unit 13 is an example of a first verification unit. The certificate information display control unit 313 is an example of a display control unit. The register verification unit 12 is an example of a second verification unit. The web page transmission unit 22 is an example of a second transmission unit.

Although the embodiment of the present invention has been described in detail above, the present invention is not limited to such specific embodiments, and various modifications and changes can be made within the scope of the gist of the present invention described in the aspects.

Reference Signs List

1 Information processing system
10 Certification authority server

11 Certificate issuing unit
12 Register verification unit
13 Trademark verification unit
20 Web server
21 Certificate application unit
22 Web page transmission unit
23 Certificate storage unit
30 User terminal
31 Web browser
100 Drive device
101 Recording medium
102 Auxiliary storage device
103 Memory device
104 CPU
105 Interface device
311 Certificate acquisition unit
312 Certificate verification unit
313 Certificate information display control unit
314 Display switching setting unit
B Bus

The invention claimed is:

1. An information processing system comprising:
a certification authority server;
a web server; and
a terminal,
wherein
the certification authority server includes:
a processor; and
a memory storing program instructions that cause the processor to:
receive an issuance request for a certificate transmitted from the web server,
verify whether an operator of the web server has a right to use a trademark identified on a basis of information included in the issuance request, and to transmit a certificate including the trademark to the web server when the operator has the right,
the web server includes:
a processor; and
a memory storing program instructions that cause the processor to:
transmit the certificate to the terminal in response to access from the terminal, and
the terminal includes:
a processor; and
a memory storing program instructions that cause the processor to:
display the trademark included in the certificate.

2. The information processing system according to claim 1, wherein
the program instructions of the certification authority server cause the processor of the certification authority server to:
verify existence of the operator, and
transmit the certificate to the web server when, in addition, the existence is confirmed by the second verification unit.

3. An information processing method executed by a certification authority server, a web server, and a terminal, the method comprising:
executing, by the certification authority server,
receiving an issuance request for a certificate transmitted from the web server,
verifying whether an operator of the web server has a right to use a trademark identified on a basis of information included in the issuance request, and
transmitting a certificate including the trademark to the web server when the operator has the right;
executing, by the web server,
transmitting the certificate to the terminal in response to access from the terminal; and
executing, by the terminal,
displaying the trademark included in the certificate.

4. The information processing method according to claim 3, further comprising
executing, by the certification authority server,
verifying existence of the operator,
wherein the certificate is transmitted to the web server in the first transmission procedure when, in addition, the existence is confirmed in the second verification procedure.

5. A non-transitory computer-readable storage medium that stores therein a program causing a computer to execute:
a reception procedure of receiving an issuance request for a certificate transmitted from a web server;
a first verification procedure of verifying whether an operator of the web server has a right to use a trademark identified on a basis of information included in the issuance request; and
a first transmission procedure of transmitting a certificate including the trademark to the web server when the operator has the right.

6. The non-transitory computer-readable storage medium according to claim 5, further causing the computer to execute a second verification procedure of verifying existence of the operator,
wherein the certificate is transmitted to the web server in the first transmission procedure when, in addition, the existence is confirmed in the second verification procedure.

* * * * *